US012591777B2

(12) United States Patent
Theodorakopoulos et al.

(10) Patent No.: US 12,591,777 B2
(45) Date of Patent: Mar. 31, 2026

(54) PARSIMONIOUS INFERENCE ON CONVOLUTIONAL NEURAL NETWORKS

(71) Applicant: IRIDA LABS S.A., Patras (GR)

(72) Inventors: Ilias Theodorakopoulos, Aigio (GR);
Vassileios Pothos, Patras (GR);
Dimitris Kastaniotis, Athens (GR);
Nikos Fragoulis, Patras (GR)

(73) Assignee: IRIDA LABS S.A., Patras (GR)

( * ) Notice: Subject to any disclaimer, the term of this patent is extended or adjusted under 35 U.S.C. 154(b) by 930 days.

(21) Appl. No.: 17/732,894

(22) Filed: Apr. 29, 2022

(65) Prior Publication Data

US 2022/0253711 A1      Aug. 11, 2022

Related U.S. Application Data

(63) Continuation of application No. 15/815,171, filed on Nov. 16, 2017, now Pat. No. 11,321,613.

(60) Provisional application No. 62/447,205, filed on Jan. 17, 2017, provisional application No. 62/423,546, filed on Nov. 17, 2016.

(51) Int. Cl.
 $G06N\ 3/082$ (2023.01)
 $G06N\ 3/045$ (2023.01)
 $G06N\ 3/0464$ (2023.01)
(52) U.S. Cl.
 CPC ............. *G06N 3/082* (2013.01); *G06N 3/045* (2023.01); *G06N 3/0464* (2023.01)
(58) Field of Classification Search
 None
 See application file for complete search history.

(56) References Cited

U.S. PATENT DOCUMENTS

| | | | |
|---|---|---|---|
| 10,643,129 B2 | 5/2020 | Chen et al. | |
| 11,321,613 B2 | 5/2022 | Theodorakopoulos et al. | |
| 2009/0210218 A1 | 8/2009 | Collobert et al. | |
| 2011/0239020 A1 | 9/2011 | Thomas et al. | |
| 2016/0132767 A1 | 5/2016 | Alpert et al. | |
| 2019/0156201 A1 | 5/2019 | Bichler et al. | |

(Continued)

FOREIGN PATENT DOCUMENTS

| | | | |
|---|---|---|---|
| DE | 10208682 A1 | 6/2003 | |
| WO | WO 2017/185386 A1 | 11/2017 | |
| WO | WO 2017/185391 A1 | 11/2017 | |

OTHER PUBLICATIONS

Park et al., Big/Little Deep Neural Network for Ultra Low Power Inference; IEEE 2015; pp. 124-132 (Year: 2015).*

(Continued)

*Primary Examiner* — Alan Chen
(74) *Attorney, Agent, or Firm* — Jason H. Vick; Amped IP LLC

(57) ABSTRACT

The disclosed system incorporates a new learning module, the Learning Kernel Activation Module (LKAM), at least serving the purpose of enforcing the utilization of less convolutional kernels by learning kernel activation rules and by actually controlling the engagement of various computing elements: The exemplary module activates/deactivates a sub-set of filtering kernels, groups of kernels, or groups of full connected neurons, during the inference phase, on-the-fly for every input image depending on the input image content and the learned activation rules.

5 Claims, 11 Drawing Sheets

(56)                References Cited

U.S. PATENT DOCUMENTS

2020/0257977 A1     8/2020    Fragoulis et al.

OTHER PUBLICATIONS

Annema, Anne-Johan "Feed-Forward Neural Networks Vector Decomposition Analysis, Modelling and Analog Implementation" Springer-Science+Business Media, LLC; 1995.

Anwar, Sajid et al. "Compact Deep Convolutional Neural Networks with Coarse Pruning" arXiv:1610.09639v1 [cs.LG] Oct. 30, 2016.

Anwar, Sajid et al. "Structured Pruning of Deep Convolutional Neural Networks" ACM Journal on Emerging Technologies in Computing Systems; vol. 13, No. 3, Article 32; Feb. 2017.

Ba, Lei Jimmy et al. "Do Deep Nets Really Need to be Deep?" Advances in Neural Information Processing Systems; NIPS 2014.

Bossard, Lukas et al. "Food-101—Mining Discriminative Components with Random Forests" European Conference on Computer Vision; ECCV 2014.

Butts, J. Adam et al. "A Static Power Model for Architects" IEEE Proceedings 33rd Annual IEEE/ACM International Symposium on Microarchitecture; MICRO-33 2000; 2000.

Cheng, Yu et al. "An Exporation of Parameter Redundancy in Deep Networks with Circulant Projections" IEEE International Conference on Computer Vision; 2015.

Feng, Jiashi et al. "Learning the Structure of Deep Convolutional Networks" The IEEE International Conference on Computer Vision (ICCV), 2015, pp. 2749-2757.

Figurnov, Michael et al. "PerforatedCNNs: Acceleration Through Elimination of Redundant Convolutions" arXiv:1504.08362v4 [cs.CV]; Oct. 16, 2016.

Gershman, Samuel J., et al. "Computational Rationality: A Converging Paradigm for Intelligence in Brains, Minds, and Machines" Science, vol. 349, Issue 6245, pp. 273-278; Jul. 17, 2015.

Graves, Alex et al. "Framewise Phoneme Classification with Bidirectional LSTM Networks" Proceedings of International Joint Conference on Neural Networks, Montreal, Canada, Jul. 31-Aug. 4, 2005.

Han, Song et al. "Learning Both Weights and Connections for Efficient Neural Networks" Proceedings of Advances in Neural Information Processing Systems (NIPS), 2015.

He, Kaiming et al."Deep Residual Learning for Image Recognition" IEEE Conference on Computer Vision and Pattern Recognition (CVPR); 2016.

Hu, Hengyuan et al. "Network Trimming: A Data-Driven Neuron Pruning Approach towards Efficient Deep Architectures" arXiv:1607.03250v1 [cs.NE]; Jul. 12, 2016.

Huiskes, Mark J et al. "The MIR Flickr Retrieval Evaluation" MIR '08, Oct. 30-31, 2008; Vancouver, British Columbia, Canada; 2008.

Iandola, Forrest N. et al. "SqueezeNet: AlexNet-Level Accuracy with 50x Fewer Parameters and <0.5MB Model Size" arXiv:1602.07360v4 [cs.CV], Nov. 4, 2016.

Krizhevsky, Alex et al. "ImageNet Classification with Deep Convolutional Neural Networks" Communications of the ACM; vol. 60, Issue 6, Jun. 2017.

LeCun, Yann et al. "Deep Learing" Nature vol. 521; May 28, 2015; pp. 436-444.

Lin, Min et al. "Network in Network" Neural and Evolutionary Computing; 2014.

Nawi, Nazri Mohd et al. "The Effect of Gain Variation in Improving Learning Speed of Back Propagation Neural Network Algorithm on Classification Problems" Symposium on Progress in Information & Communication Technology 2009.

Russakovsky, Olga et al. "ImageNet Large Scale Visual Recognition Challeng" ImageNet Large Scale Visual Recognition Challenge.; JCV, 2015.

Stepniewski, Slawomir W et al. "Pruning Backpropagation Neural Networks Using Modern Stochastic Optimisation Techniques" Neural Computing & Applications 5: 76-98; 1997.

Wen, Wei et al. "Learning Structured Sparsity in Deep Neural Networks" arXiv:1608.03665v4 [cs.NE]; Oct. 18, 2016.

Yang, Tien-Ju et al. "Designing Energy-Efficient Convolutional Neural Networks Using Energy-Aware Pruning" arXiv preprint arXiv:1611.05128; Published Nov. 16, 2016.

Office Action for U.S. Appl. No. 15/815,171, mailed Nov. 12, 2020.

Office Action for U.S. Appl. No. 15/815,171, mailed Apr. 9, 2021.

Office Action for U.S. Appl. No. 15/815,171, mailed Jul. 28, 2021.

Notice of Allowance for U.S. Appl. No. 15/815,171, mailed Jan. 12, 2022.

Notice of Allowance for U.S. Appl. No. 16/784,140 mailed Aug. 17, 2022.

* cited by examiner

Filter Kernels of the i-th Layer

PARSIMONIOUS INFERENCE ON CONVOLUTIONAL NEURAL NETWORKS

RELATED APPLICATION DATA

This application is a Continuation of U.S. patent application Ser. No. 15/815,171, filed Nov. 16, 2017, now U.S. Pat. No. 11,321,613 which claims the benefit of and priority under 35 U.S.C. § 119 (e) to U.S. Patent Application No. 62/423,546 filed Nov. 17, 2016, entitled "ENERGY EFFI-CIENT DEEP LEARNING STRUCTURES," and U.S. Patent Application No. 62/447,205, filed Jan. 17, 2017, entitled "PARSIMONIOUS INFERENCE ON CONVOLUTIONAL NEURAL NETWORKS: LEARNING AND APPLYING ON-LINE KERNEL ACTIVATION RULES," each of which are incorporated herein by reference in their entirety.

BACKGROUND

Field

An exemplary aspect relates to the field of pattern recognition, and in one exemplary embodiment to the field of image recognition. More specifically it relates to the use of deep convolutional artificial neural networks for image recognition and discloses how these kind of pattern classification structures may be augmented in order to become parsimonious in computations and thus made appropriate for computing devices with low processing capacity or featuring a short battery life. The methods and systems described enable more economical implementations for porting to cloud computing frameworks by requiring less computational resources.

Description of the Related Art

Deep learning was primarily developed as a tool to find meaningful representations from large collections of data. In order to achieve this, a complex function of the data is learned using a large sequence of simple functions, which in turn results in a large number of parameters. These simple functions however are both computational and memory intensive. Therefore, this initial approach contradicts modern applications where power consumption and inference time play a major role. In particular, for the case of IoT (Internet of Things) applications the overall computational load as well as the total number of memory transactions might become prohibitive.

To this end, the reduction of the computational load associated with a specific deep-learning structure is the enabling factor towards the broadening of the application field of these structures to IoT and in general to applications featuring a system with low computational capabilities.

Current approaches attempt to exploit the data sparsity and the redundancy of the parameters inherent in CNNs (Convolutional Neural Networks) in order to prune some parts of the convolutional network and thus ease the computational load of the overall structure, in an off-line, post-training approach. In some methods, the coefficients of a CNN are analyzed after training and some of them are zeroed according to their magnitude, leading to sparse matrices exploitable by sparse arithmetic software. In some others, the CNN is trained in such a way so to result on a set of coefficients containing as many insignificant coefficients as possible.

In a data-driven approach, [Hu16] proposed a method which iteratively optimizes the network by pruning unimportant neurons based on analysis of their outputs on a large dataset.

Feng et al. [Feng15] proposed a method for estimating the structure of the model by utilizing un-labelled data. Their method called Indian Buffet Process CNN (ibpCNN), captures the distribution of the data and accordingly balances the model between complexity and fidelity.

Similarly, Wen et al. [Wen16] incorporated Structured Sparsity Learning (SSL) in order to regularize the number of filters (and their shapes), the number of channels and the depth of the network. From an implementation perspective, SSL also targets to the formulation of a dense weight matrix in order to completely remove channels, filters or even whole layers.

Yang et al. [Yang] proposed an energy-aware pruning algorithm for CNNs that directly uses energy consumption estimation of a CNN to guide the pruning process. For each layer, the weights are first pruned and then locally fine-tuned with a closed-form least-square solution to quickly restore the accuracy.

Authors in [Han2015] proposed a three-step method, which allowed them to prune redundant connections without affecting the accuracy. In the first step, they train a network to learn which connections are important. In the second stage, connections characterized as unimportant are pruned and in the last stage, the network is re-trained in order to fine-tune the weights.

Similarly, in [PeforatedCNNs] authors targeting to implementations for low power devices, by taking advantage of the sparsity immanent in intermediate filter responses in order to reduce the spatial convolution at every layer. More specifically, they are inspired by the loop perforation technique (originally proposed for source code optimization) in order to skip the convolution operation at several locations.

All the above-mentioned approaches result in the reduction of the overall computational resources of a CNN necessary for making an inference. However, they always use the same (reduced) amount of computational resources for any kind of input.

An exemplary aspect is proposed in which the amount of computational resources used within a CNN is adapted to the input data, and where the CNN is able to learn to always use the minimum amount of computational resources. In addition, the amount of computational resources to be used can in this method be adapted to the system, by trading-off some of the recognition accuracy.

BRIEF SUMMARY OF THE DRAWINGS

A system and a method is disclosed herein which at least provides a systematic way for implementing CNN variants that are parsimonious in computations. To this end, the disclosed approach allows training a CNN at least in order to:

i) Use as few computing resources as possible. The devised procedure results in an optimal pruning of a CNN architecture, guided by the complexity of the task and the nature of the input data.

ii) Change size and form on-the-fly during inference, depending on the input data: The fact that the network changes size and structure for every input datum is what is meant by "on-the-fly." This property enables one to perform inference using less effort for "easier" instances of data than others.

iii) Optimize for the above objectives via regular back-propagation (or other regular training method such as reinforced learning) simultaneously with the primary task objective of the model. This way we avoid the prune-fine-tune iterative procedure, which is usually followed in order to reduce the size of a model.

The disclosed system incorporates a new learning module, the Learning Kernel Activation Module (LKAM), serving the purpose of enforcing the utilization of less convolutional kernels by learning kernel activation rules and by actually controlling the engagement of various computing elements: The module activates/deactivates a sub-set of filtering kernels, groups of kernels, or groups of full connected neurons, during the inference phase, on-the-fly for every input image depending on the input image content and the learned activation rules.

Using this module, the CNN essentially learns how to reduce its initial size on-the-fly (e.g. for every input image or datum), through an optimization process which guides the network to learn which kernel need to be engaged for a specific input datum. This results in the selective engagement of a subset of computing elements for every specific input datum, in contrast with the traditional approaches which for every input datum employ the totality of the computing elements independently of the datum.

Since a reduction in the number of applied kernels in any layer leads to the reduction of channels passed into the next layer, the reduction of the overall computational load is even more important.

The method disclosed herein is compatible with any contemporary deep CNN architecture and can be used in combination with other model thinning approaches (optimal filtering, factorization, etc.) to produce additional processing optimization.

BRIEF DESCRIPTION OF THE DRAWINGS

Figure 1:
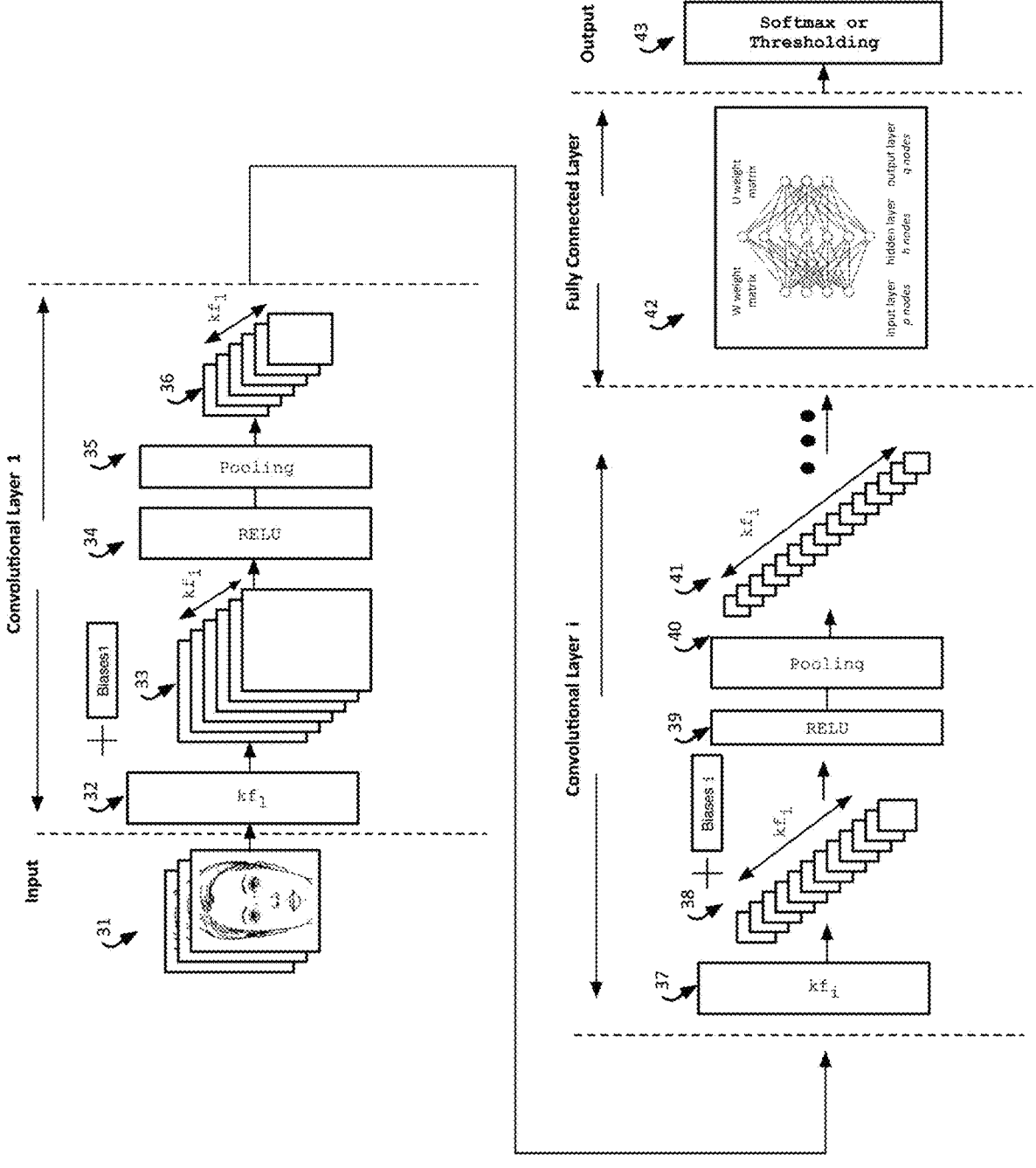
Figure 1A:
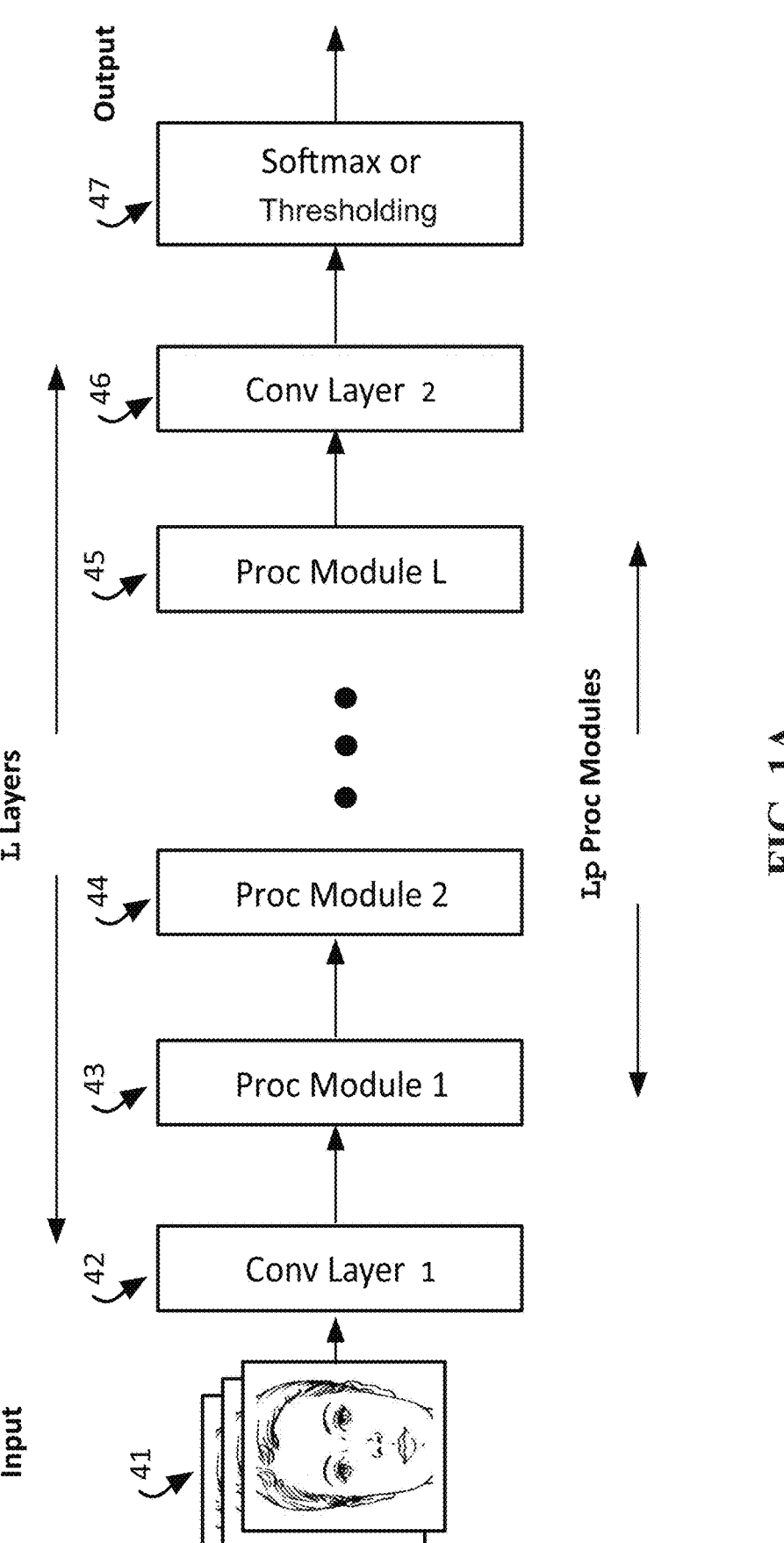
Figure 1B:
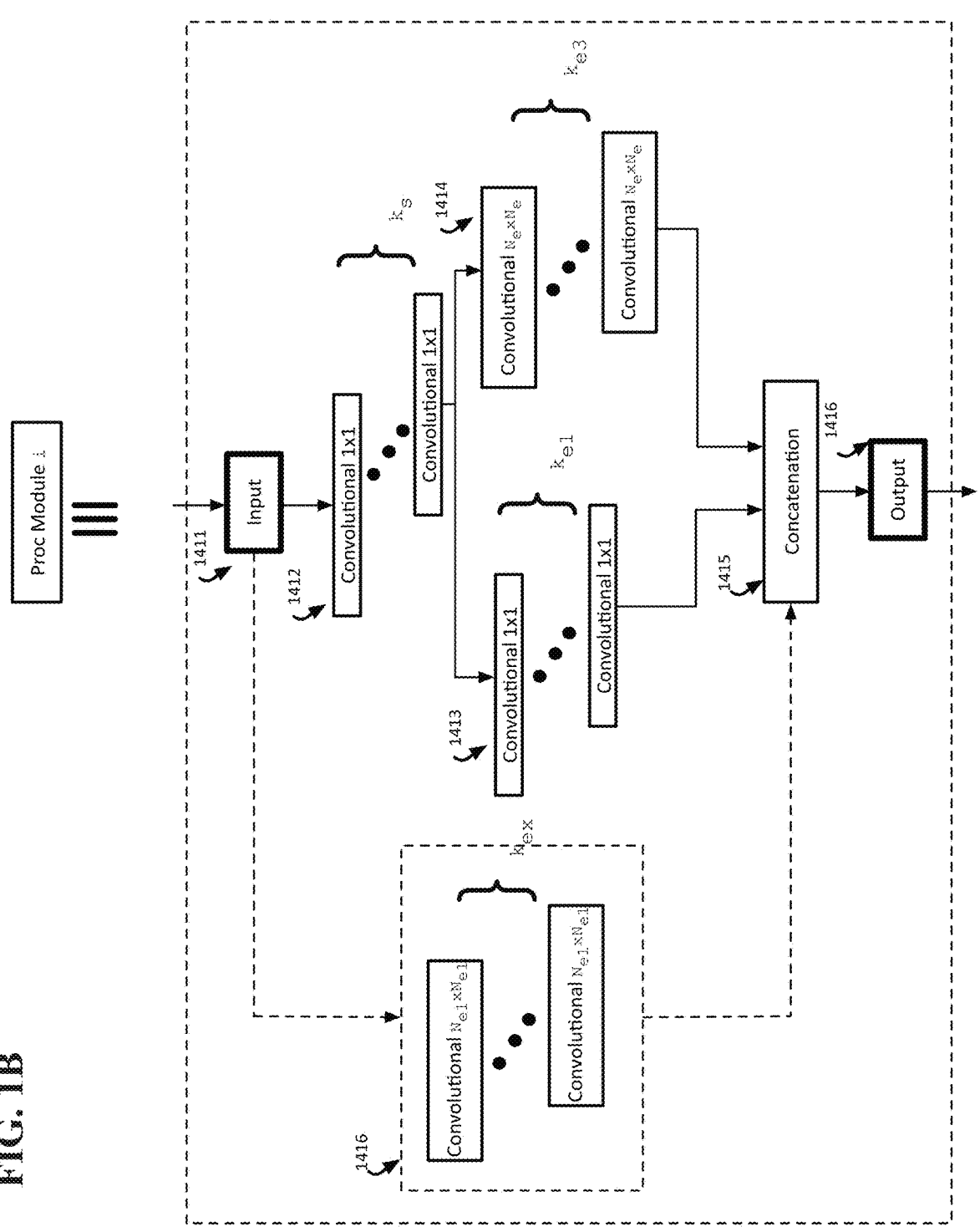
Figure 2:
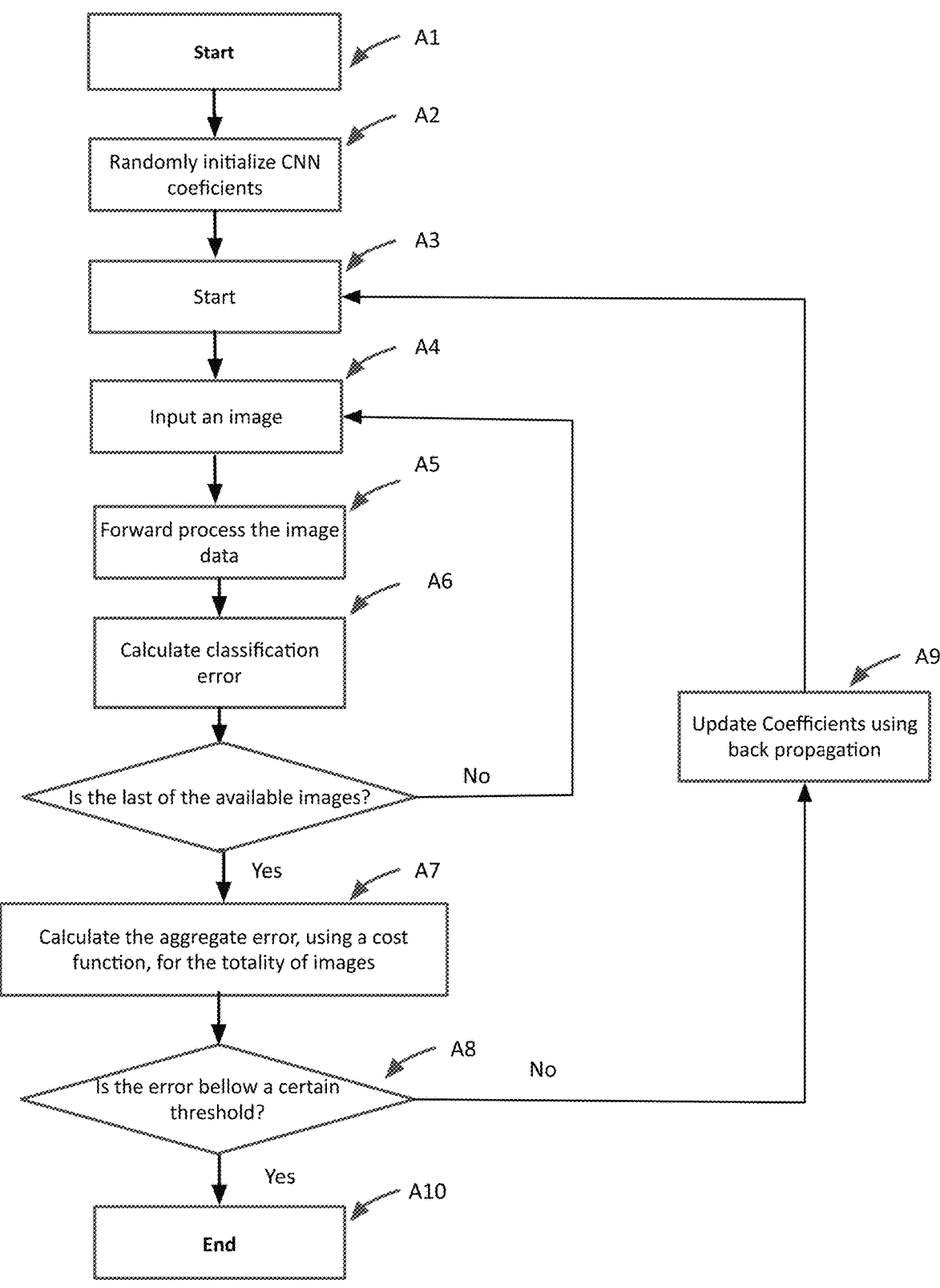
Figure 3:
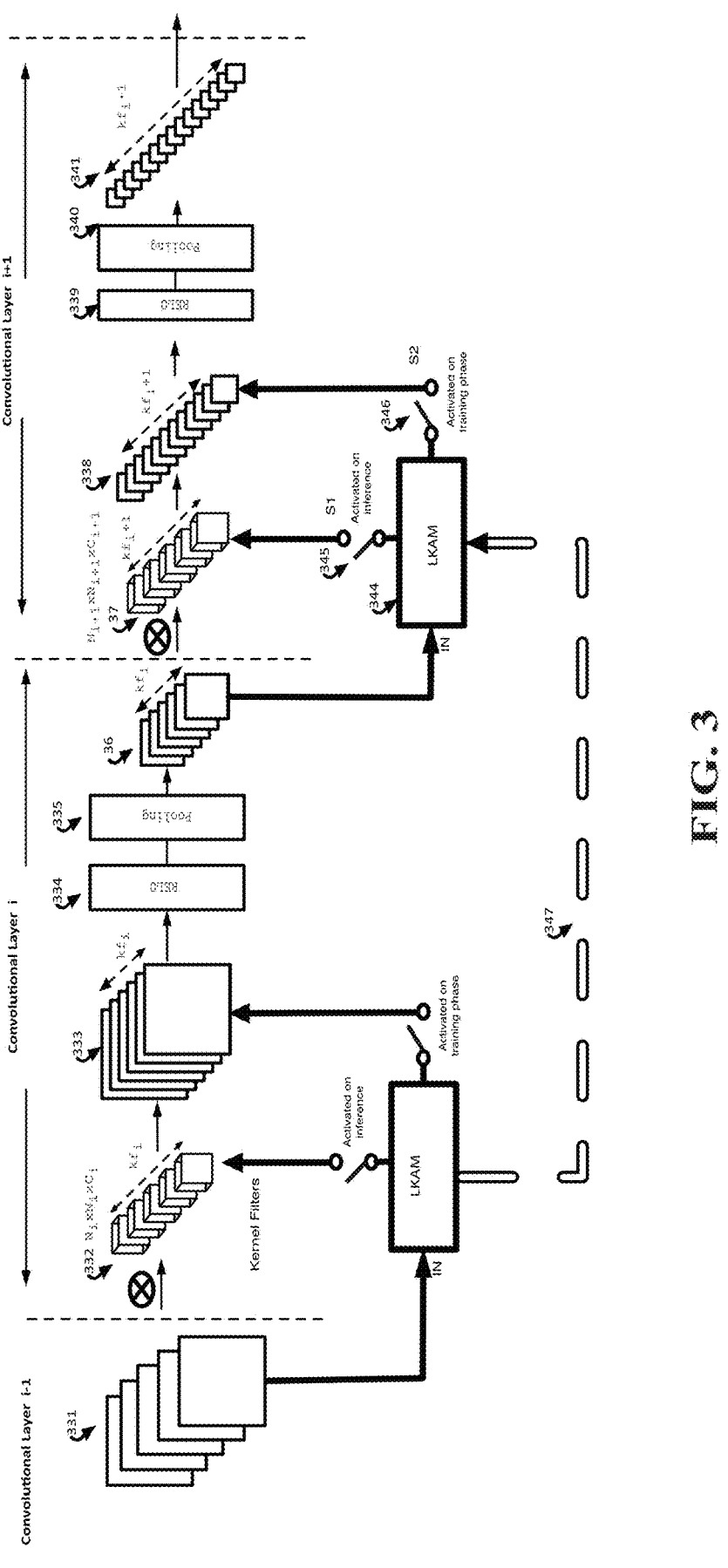
Figure 4:
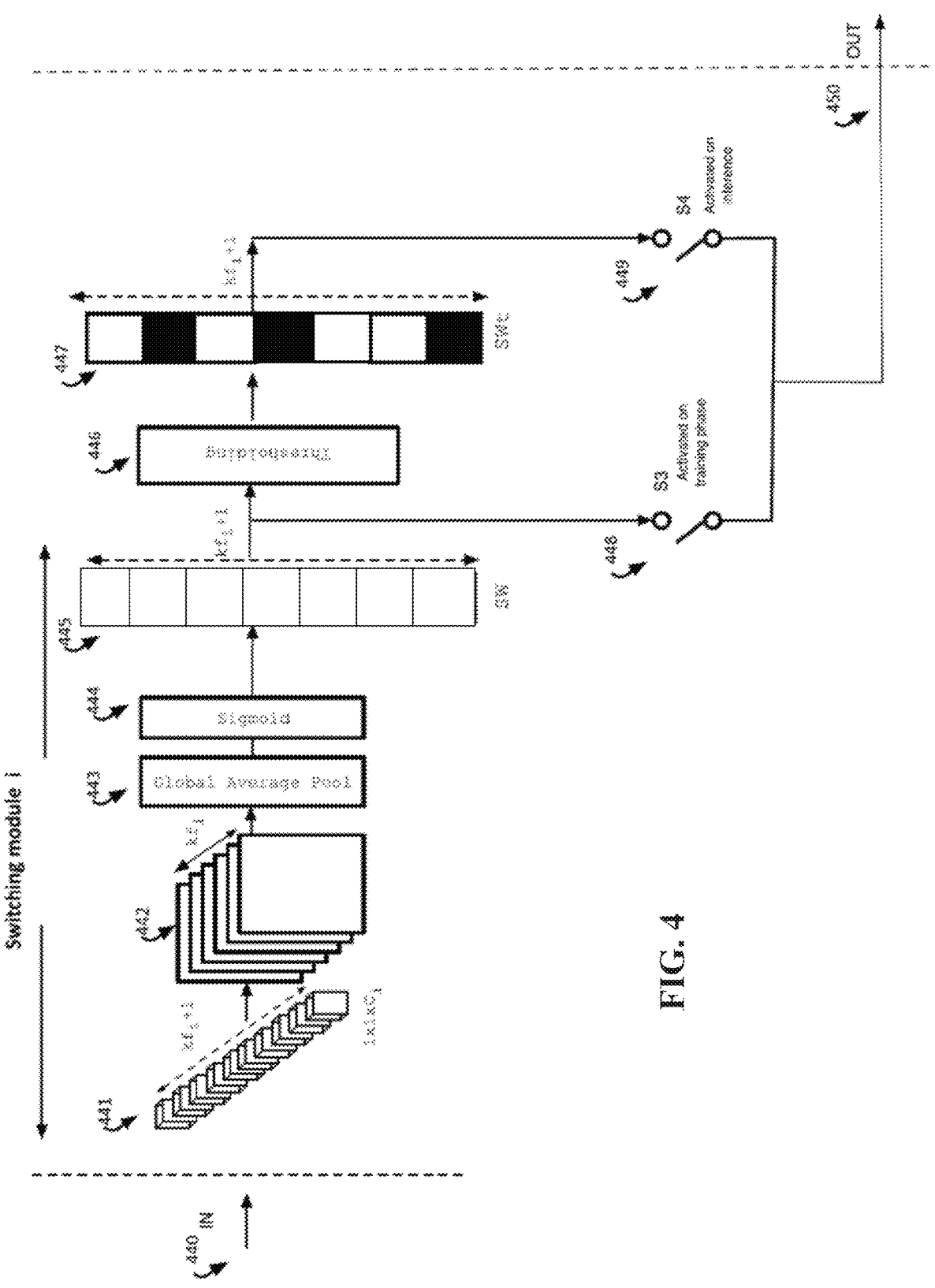
Figure 5:
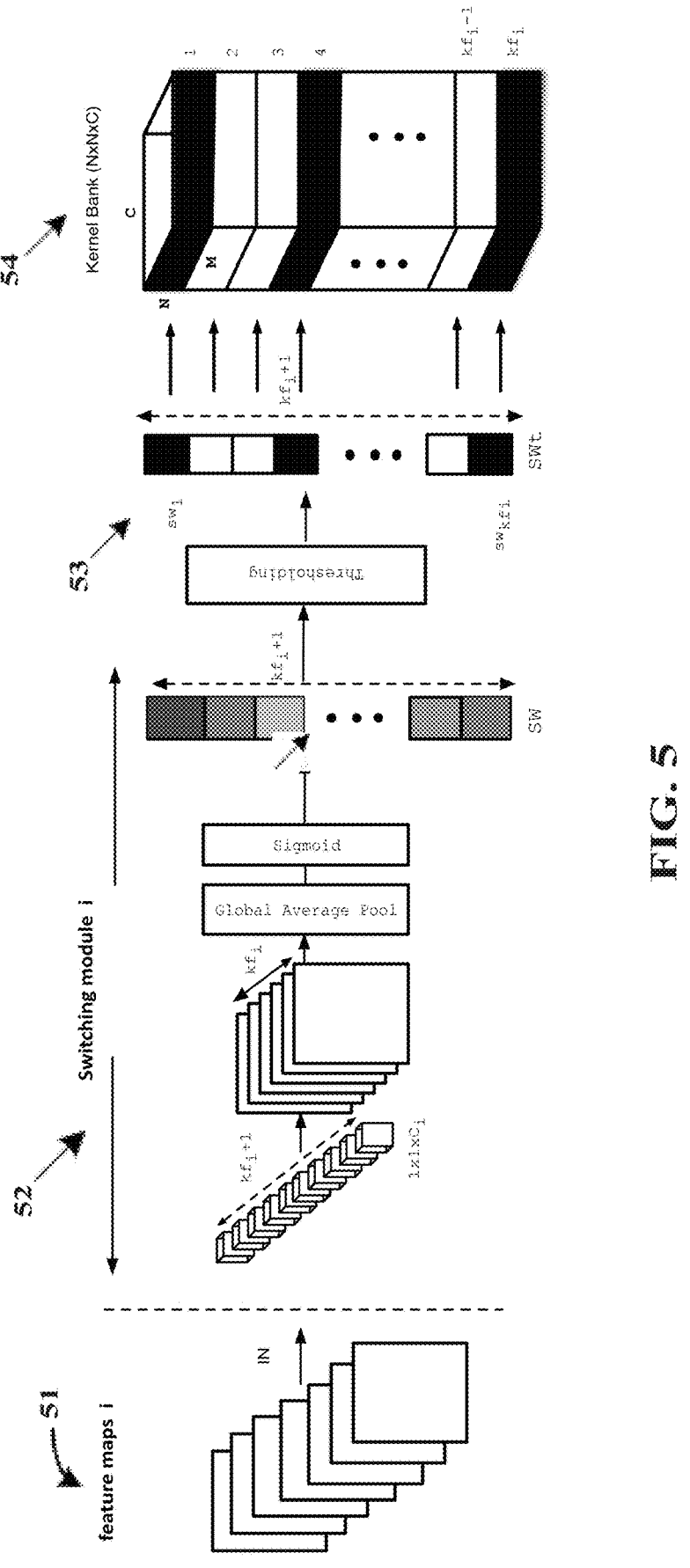
Figure 6:
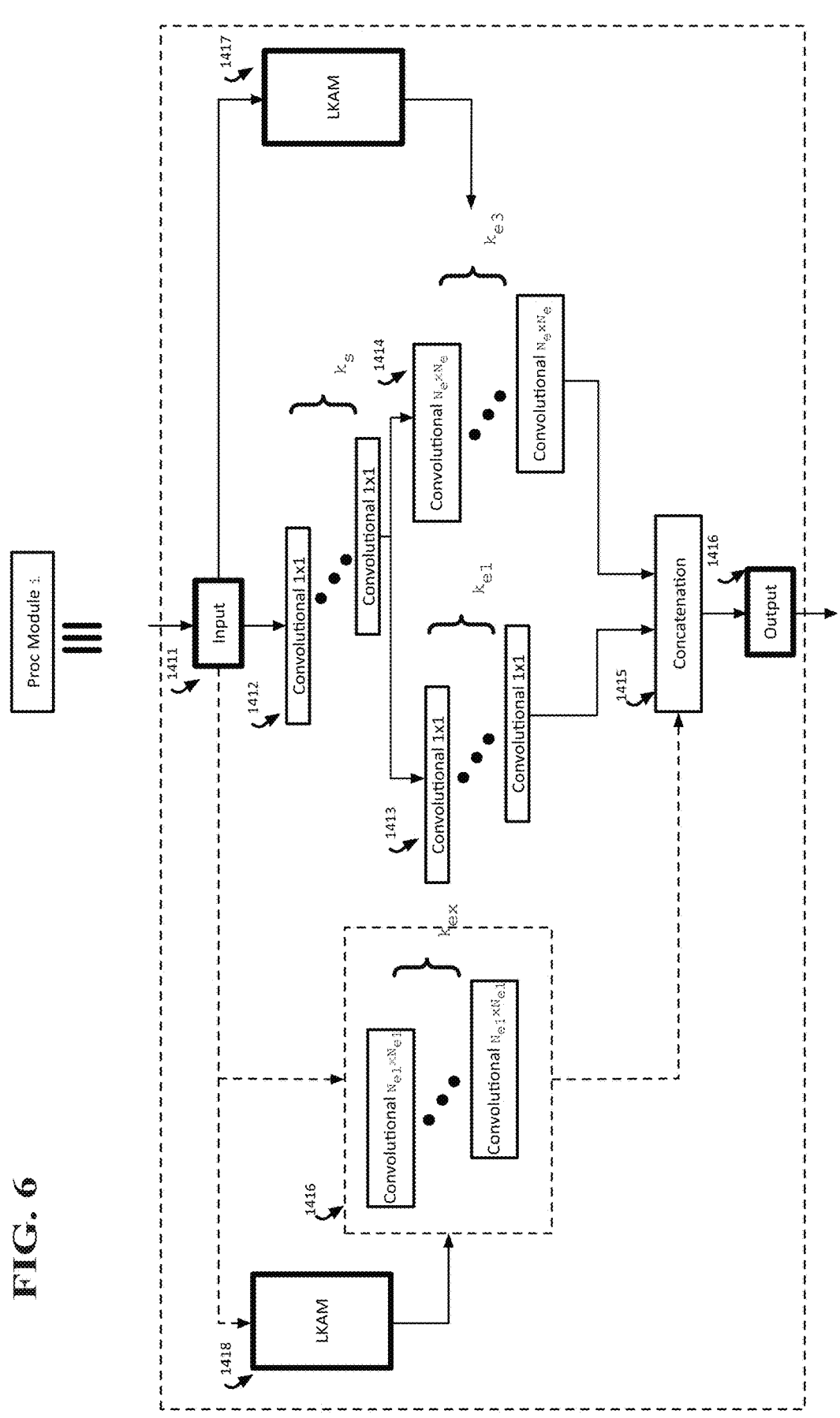
Figure 6A:
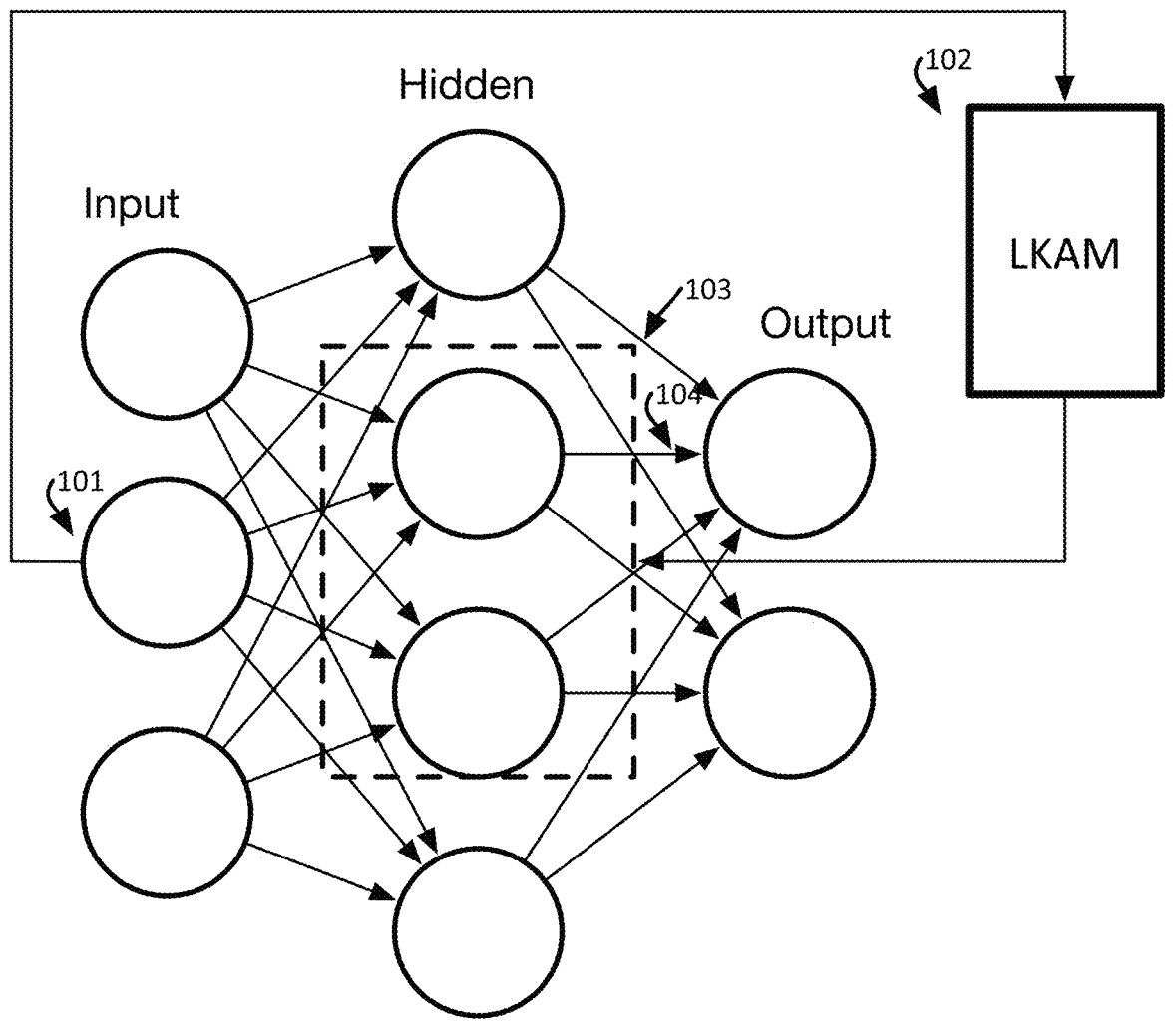
Figure 7:
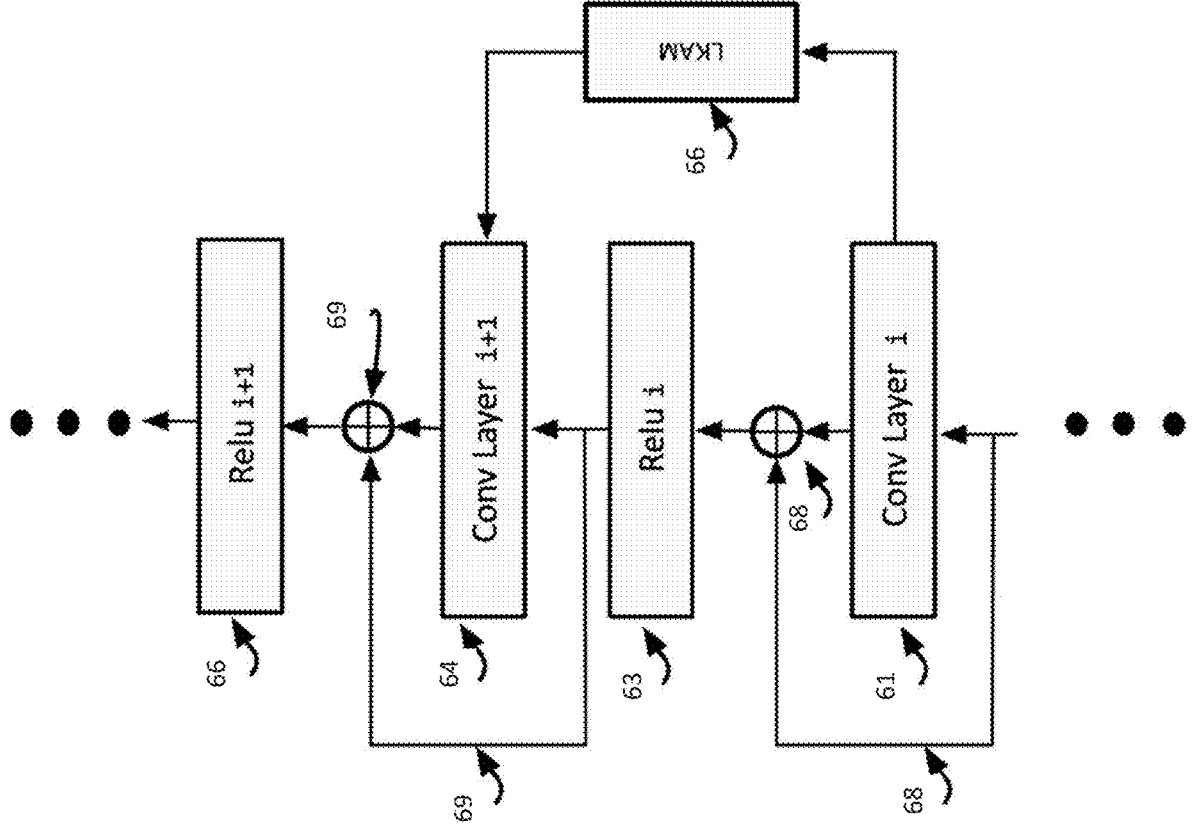
Figure 8:
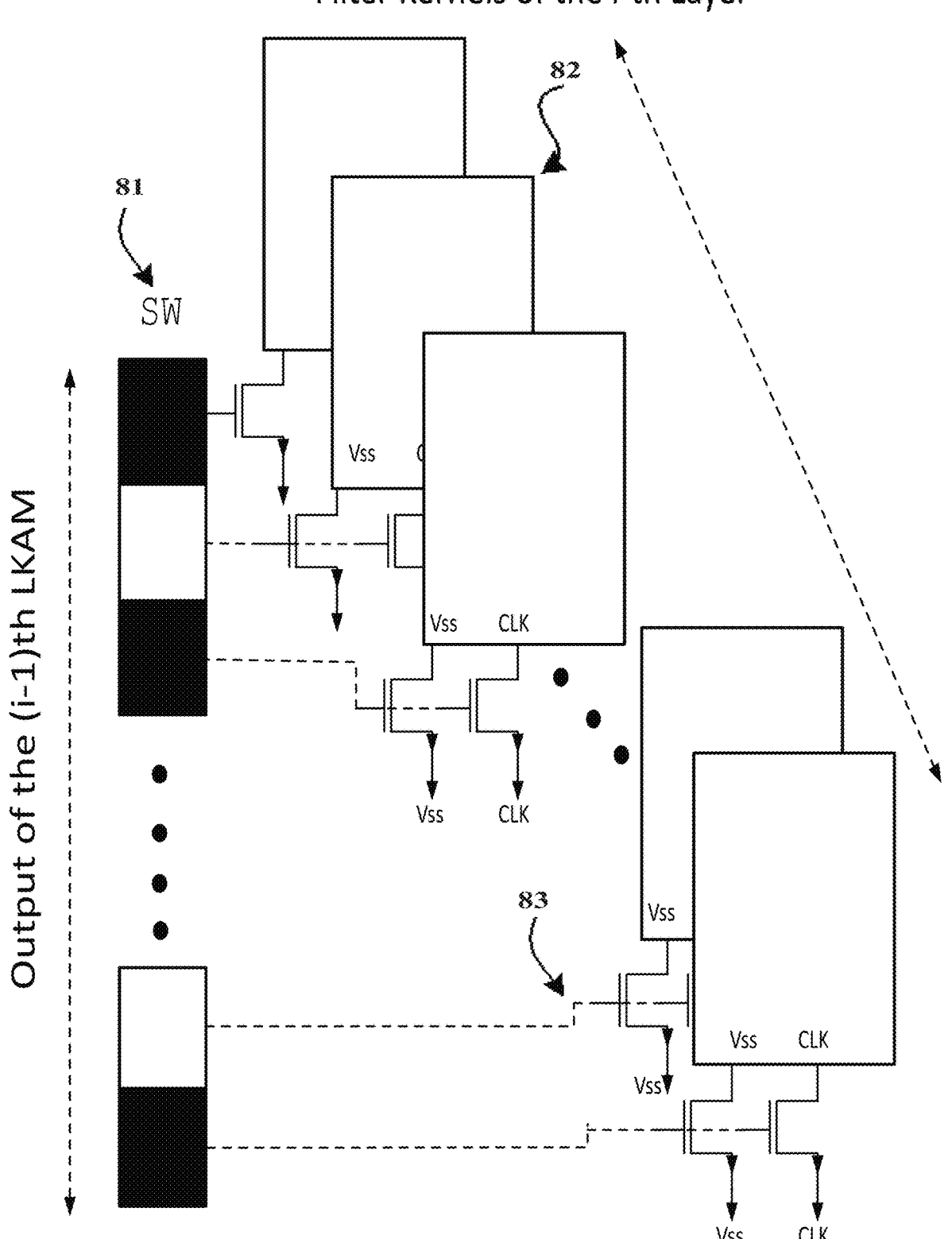

The exemplary embodiments of the invention will be described in detail, with reference to the following Figures, wherein:

FIG. 1 illustrates an exemplary Convolution Neural Network in accordance with at least one embodiment;

FIG. 1A illustrates sequential processing cells in accordance with at least one embodiment;

FIG. 1B illustrates general processing modules in accordance with at least one embodiment;

FIG. 2 illustrates an exemplary method for coefficient calculation in accordance with at least one embodiment;

FIG. 3 illustrates a snapshot of a convolution network in accordance with at least one embodiment;

FIG. 4 illustrates a materialized LKAM in accordance with at least one embodiment;

FIG. 5 illustrates an exemplary convolution layer in accordance with at least one embodiment;

FIG. 6 illustrates exemplary network modules in accordance with at least one embodiment;

FIG. 6A illustrates exemplary fully connected layers in accordance with at least one embodiment;

FIG. 7 illustrates an exemplary CNN architecture utilizing layer bypass connections in accordance with at least one embodiment; and FIG. 8 illustrates exemplary filter kernels in accordance with at least one embodiment.

DETAILED DESCRIPTION OF THE INVENTION

1. Traditional Convolutional Neural Networks 1.1. The Architecture

A Convolutional Neural Network—CNN (FIG. 1) comprises, in general, of a number of convolutional and sub-sampling layers occasionally followed by a fully connected neural network layer.

The input (31 in FIG. 1) to a convolutional network is a datum (i.e. an image) of size m×m×r where m is the height and width of the input image and r is the number of channels, e.g. an RGB image has r=3.

The next stages follow a number of convolutional layers. A convolutional layer (32, 37 in FIG. 1) will have $k_{fi}$ filters, or kernels, of size n×n×q where n is smaller than the dimension of the input datum, i is the number of the layer and q can either be the same as the number of channels r or smaller and may vary for each kernel. Each of these kernels is represented by a 4D matrix (or tensor) of size $k_{fi}$×n×n'q. Each kernel performs the following mathematical operation known as convolution:

$$y_{ij'k} = \Sigma_{ijk} w_{ijkk} x_{i+i'j+j'k} \tag{1}$$

The size of the kernels gives rise to the locally connected structure which is then convolved with the input to produce $k_{fi}$ convolution outputs, also called feature maps, of size either m×m or smaller (33, 38 in FIG. 1).

Each map is then subsampled typically with mean or max pooling over p×p contiguous regions (35, 40 in FIG. 1). This is an average or max operation over p×p numbers to produce one calculate the total average or find the maximum of those numbers and result to a smaller feature map which is $p^2$ times smaller.

Directly after the convolutions an additive bias and non-linearity (sigmoidal, hyperbolic tangent etc.) or a rectified linear unit (RELU, leaky RELU etc.) is applied to each feature map (34, 39 in FIG. 1).

After a number L of convolutional layers there may be any number of fully connected layers (42 in FIG. 1). These densely connected layers are identical to the layers in a standard fully connected multilayer neural network [BA].

The outputs of such a network is a vector of numbers, from which the probability that a specific input image belongs to the specific class (e.g. the face of a specific person) can be inferred. For that reason, the output layer (43 in FIG. 1) of the CNN is usually a "softmax" layer which maps the network output vector to class probabilities. But the required type of output should be a single binary decision for the specific image (e.g. is it this specific person) This requires that the output correspond to a specific class to be "1" and for all the other classes to be "0". This is achieved through thresholding on class probabilities: Each output takes the value "0" if is smaller than a threshold and "1" otherwise.

Each convolutional network is defined by its architectural details (e.g. size and number of convolutional kernels, number and kind of pooling units, and connectivity between convolutional layers), as well as its parameters which are the coefficients of the convolutional kernels and the values of biases.

A CNN comprised by more than three layers is named a deep-learning network, and normally the inference accuracy of a CNN increases as the CNN gets deeper. The accuracy obtained by deep architectures on image classification and object detection tasks has proved that depth of representation is indeed the key to a successful implementation.

The number of coefficients required to describe a CNN is directly related to its architecture as defined above: More convolutional layers, means more parameters. Therefore, apart from the required computational complexity, another basic downside of the deep learning CNN architectures is that they require hundreds of MBytes in coefficients for the convolutional kernels to operate. Such requirements can render the embedded implementation of similar networks rather prohibitive, since these coefficients are associated with a large number of memory loads and stores.

As an example, in a typical scenario where a CNN has to operate on a video stream, in order to produce a real-time video annotation captured by a camera sensor, the allocation and data transfers needed are huge (several of GB/sec). This is a rather intense workload for an embedded device's memory, particularly when it has to be completed within a limited time period, (e.g. starting when the user opens the camera app and ending when the video recording starts).

1.1.1 Networks of Modules

In order to address such issues a different approach could be followed towards the use of a special CNN architecture that requires significantly fewer coefficients. Such a CNN is based on the smart combination of small convolutional kernels and a complex network architecture that enables information to flow through different paths, facilitating the construction of sufficiently high-order image representations that are suitable for the face recognition application. Such approaches result in coefficients that require a couple of Megabytes of memory space, which means a reduction of 100 times or more from the scenario we described above.

This alternative traditional network is composed of, in general, sequential processing cells, as shown in FIG. 1A comprised by L convolutional layers and $L_P$ processing modules. The output of each processing cell is passed for further processing into the next processing cell. The output of the last processing cell (45 in FIG. 1A) is fed into the last stage of the network (46, 47 in FIG. 1A) which is composed by a number of convolutional or/and Fully-connected layers that produce the output.

An exemplary general architecture within all processing modules can be described in general as shown in FIG. 1B.

In accordance with one implementation of such a module, the input (1411 in FIG. 1B) is initially processed by a block of $K_S$ convolutional layers based on 1×1 kernels in order to reduce the number of channels (1412 in FIG. 1B). The output of this layers is then directed into a number of blocks of convolutional layers, a number of which (one in a preferred embodiment) is based on $K_{e1}$ layers based on 1×1 kernels (1413 in FIG. 1B), a number of blocks (one in a preferred embodiment) comprised by $K_{e3}$ layers based on $N_x \times N_e$ kernels (1414 in FIG. 1B) and also into a separate block of convolutional layers comprised by $K_{SX}$ layers based on $N_e \times N_e$ kernels directly feeding the output (1416 in FIG. 1B). The outputs of all units (1412, 1413 and 1416 in FIG. 1B) are combined by the concatenation unit (1415 in FIG. 6) via element-wise operations and concatenation of the different channels, producing the output of the processing cell.

Any number of the convolutional layers (1412, 1413, 1414 and 1416 in FIG. 1B) can be substituted by processing sub-cells in order to further reduce the total number of model's coefficients. In an exemplary embodiment of the processing module, the parameters are $K_S$=16, $K_{e3}$=16, $K_{e1}$=16, $K_{ex}$=0, $N_e$=3.

1.2. The Training

Traditionally the coefficients of a CNN network are calculated during the training phase (FIG. 2). In this phase, the network operates over an annotated (labeled) image dataset. First the CNN coefficients are initialized to some value (e.g. using some random number generation algorithm, A2 in FIG. 2). Then, each image in the database is fed into the CNN network (A4 in FIG. 2) which in turn processes this image and outputs a decision about the identity of the image (A5 in FIG. 2), in a process which is called forward propagation. The output of the network is compared with the correct image label stored in the database annotation data (A6 in FIG. 2). This process results in a classification error for each image (A6 in FIG. 2).

This process is repeated over the entire image database, and the error is aggregated over the entire database (A7 in FIG. 2). The error is then compared to a threshold (A8 in FIG. 2). If the error is above the threshold, this error is then used to update the coefficients of the CNN network by using a backpropagation algorithm (A10 in FIG. 2). If the error is below this threshold, the process is terminated and the CNN network is considered as trained.

The error of the processing is calculated by using a cost or loss function. This function is selected carefully, since it heavily influences the required functionality of the CNN network. Thus, the loss function could also use information from other points (not only the output) as will be described below.

The loss or cost function is an expression that quantifies how well the network performs on a recognition task and in one embodiment it can be written as:

$$L_t(w, b) = \frac{1}{2n} \sum_x \|y(x) - a\|_2^2 \tag{2}$$

Here, w denotes the collection of all weights in the network, b all the biases, n is the total number of training inputs, y is the vector of outputs from the network when x is input, a is a vector of labels of the training data x, and the sum is over all training inputs, x.

2. Parsimonious Convolutional Neural Networks

The target of the framework disclosed here is to implement a CNN structure able to learn its primary task, while being economical on both size and complexity. Since the main source of computational load in a CNN is the number of the convolutional kernels employed in each and every convolutional layer, the idea exploited in this invention is to setup a process and a mechanism according to which, each kernel either learns how to capture useful information (i.e. learns a kernel activation rule) or vanishes along with the corresponding channel. At the same time the overall training process is modified to be able to enforce on-the-fly kernel sparsity patterns (and by sparsity here we mean the fact that training results in only certain paths, a sparse number, being connections between layers) via simultaneously learned, data-driven kernel activation rules. By modifying the cost function, the total number of kernels used is penalized by contributing positively to the optimization process cost function. In this way the optimization process pursues using the minimum number of computing kernels.

The same rules can be used during inference in order to avoid computing kernels which are not useful for a particular datum. That way, only the relevant kernels are computed, resulting in a significant savings in processing time and power. At the end of the training procedure, kernels that have not managed to learn features that are relevant to any of the data, resulting in zero utilization, can be permanently pruned from the model.

This exemplary technique, is based on two main elements:

i) A special module which is able to learn kernel activation rules. This element, named the Learning, Kernel-Activation Module—LKAM—is a small CNN and is able to learn from the data and control which elements will participate in the overall algorithmic process for each specific input datum.

ii) An optimization cost function, which penalizes the use of computational elements by taking into account the number of kernels used for a forward propagation.

2.1. The Learning, Kernel-Activation Module—LKAM

One aspect of this invention is shown in FIG. 3. In this figure, a snapshot of part of a convolutional network is shown comprised by the i-th and the (i+1)-th convolutional layers. Since a key concept of this invention is to simultaneously learn kernel coefficients and kernel activation rules during a standard training procedure, a convolutional layer has to be modified in a way that enables the soft transition from a typical convolutional layer to a layer with dynamic kernel population. In order to achieve this variability, a special module needs to be introduced which will be able to control the degree of engagement of convolutional kernels into the convolutional layers, by being able to switch on or off individual kernels within each layer.

To achieve this a module named Learning Kernel Activation Module—LKAM (344 in FIG. 3) is introduced. This module, is a small CNN network, that acts as a learning switch, and is capable of switching on and off individual convolutional kernels in any layer, depending on the data present at its input.

In one embodiment, the LKAMs are connected between individual convolutional layers. In a different embodiment, information can also flow from LKAM to LKAM directly, e.g. by using a properly designed Fully-connected neural network (347 in FIG. 3).

The main aim of LKAM modules is to learn activation rules for each kernel and thus induce the desired channel-wise sparsity into the feature maps simultaneously. This is later exploited during the inference phase.

Many types of activation rules can be formulated using regular differentiable functions, including those typically used in deep-learning frameworks. In one embodiment, a set of simple and lightweight rules is used constituted by a bank of 1×1 convolutional kernels followed by average pooling and a sigmoid function that offers a smooth and differentiable transition between active and inactive states. In this embodiment, the transition takes place gradually during training, since the "unnecessary" feature channels for each datum are gradually weakened through the multiplication with coefficients which are computed by the corresponding linear rules. The sigmoid function is used as a "soft switch", limiting each channel's multiplier in the range [0,1]. The choice of this rule is made in order to keep computational overhead of the LKAM modules as low as possible.

During inference these coefficients have the role of kernel activation rules indicating whether the kernels that produce the corresponding channels need to be computed. Thus, the values of the activation rules are calculated first, and if each value exceeds a threshold (446 in FIG. 4), that determines whether the corresponding kernel needs to be computed or can be omitted (not calculated).

The LKAMs behave as additional elements or layers of the overall network. They are trained concurrently with the rest of the network, through the same optimization process. The difference with these modules is that they also influence the degree to which various convolutional kernels participate in the overall computational process. By virtue of a special regularization term added to the optimization cost function, the LKAMs are trained through an optimization process so as to minimize the number of kernels used for forward propagation.

In an exemplary embodiment, the LKAM module is materialized as shown in FIG. 4.

First the feature maps of the i-th convolutional layer are fed into this module (336 in FIGS. 3 and 440 in FIG. 4). These are processed by a number of $k_{fi}+1$ kernels of size $1 \times 1 \times C_{i+1}$ (442 in FIG. 4). This procedure results in a number of $k_{fi}+1$ feature maps (442 in FIG. 4). These maps are then fed into a Global Average Pooling block (443 in FIG. 4) which averages the values of each feature map producing a single number for each feature map. Each of these numbers is then fed into a sigmoid function $$f(x) = \frac{1}{1 + e^{-k(x-x_0)}} \tag{3}$$

In this way a vector $SW=\{sw_1, sw_2, \ldots, sw_{k_{fi+1}}\}$ of $k_{fi}+1$ numbers having values between 0 and 1 (445 in FIG. 4), is formed.

The elements of this vector are used in the training phase, by means of the switch S3 in FIG. 4, in order to multiply the values of the corresponding feature map in the (i+1)-th convolutional layer. In this phase, switches S2 in FIGS. 3 and S3 FIG. 4 needs to be activated while switches S1 FIGS. 3 and S4 in FIG. 4 need to be deactivated.

The elements of this vector are used in the training phase, through the switch S3 (448 in FIG. 4), in order to multiply the values of the corresponding feature map in the (i+1)-th convolutional layer, thus imposing the desired sparsity. During this phase, switches S2 (346 in FIG. 3) and S3 (448 in FIG. 4) are activated, while switches S1 (345 in FIG. 3) and S4 in (449 in FIG. 4) are deactivated. This way, the information flow is tweaked by enforcing certain feature maps to gradually have smaller influence on the overall network under the corresponding rules, which are in turn co-adapting. The goal of the training process is to obtain the combination of kernels and activation rules that produce the sparsest SW vectors possible. The learned rules can indicate the kernels with zero influence so that the corresponding kernels can be excluded from computation.

2.2 Training Procedure by Means of a Special Cost Function

In one aspect of this invention, the training of the LKAM modules takes place concurrently with the training of the rest of the network with the classic approach as indicated in the flow chart of FIG A, using in one embodiment a back-propagation algorithm (e.g Stochastic Gradient Descend, AdaDelta, Adaptive Gradient, Adam, Nesterov's Accelerated Gradient, RMSprop etc.) and also involves the calculation of the weights of the $k_{fi}+1$, 1×1 convolutional masks of the switching module (441 in FIG. 4).

In the training phase, switches S2 (346 in FIG. 3) and S3 (448 in FIG. 4) are activated. In this way, each element of the vector SW multiplies the corresponding feature map in the (i+1)-th convolutional layer. This results in a prominent change in the information flow to some specific feature maps resulting in strengthening some of them and weakening others.

In order to impose the desirable channel-wise sparsity, the primary loss function used during back-propagation it is augmented with a new term, which penalizes the use of convolutional kernels by adding an extra regularization term proportional to the number of kernels that are engaged in each forward propagation step. The number of kernels engaged, is equal to the number of the non-zero elements of each sw vector. Thus, in one embodiment, the extra term is selected as the L1 norm of the sw vectors, denoted as $L_{aug}$ and given by the following equation:

$$L_{aug} = \frac{G_i}{2m} \sum_i |sw_i| \qquad (4)$$

where $sw_i$ are the elements of SW vector, $G_i$ is a gain factor and m is the length of the vector. The overall loss now becomes:

$$L(w,b,sw)=L_t(w,b)+L_{aug}(sw) \qquad (5)$$

Where $L_t$(w, b) is the main loss given in eqn. (2), dictated by the primary task of the model (e.g. Hinge loss, Euclidean etc.).

The $G_i$ factors control the weight of the extra regularization term $L_{aug}$ in the cost function. The higher its value, the higher the influence. This in turn controls how sensitive the optimization process will be to the number of active kernels. Therefore, in one aspect of this invention, by tuning the gain factors $G_i$, we control the overall utilization of resources, and also control the inference accuracy of the network in a trade-off between accuracy and algorithmic complexity.

2.3 Permanent Pruning of the CNN Network

In another aspect of this invention, past the end of the training phase, a statistical analysis is made on the values that the elements of the vector SW take, when operating on the test set of images. The test-set of images is a set of images which are pre-annotated, yet they have not been used in the training phase. They are used after the end of the training set in order to check the generalization ability of the CNN network, that is, its ability to perform well on images not included in the training set.

If the above-mentioned analysis indicate that some element of the sw vector has a value below a threshold for the majority of the images in the test set, this element is forced to have zero value. Since each element of vector sw controls (multiplies) a convolutional kernel, a zero value disables this kernel of the (i+1)-th convolutional layer and thus the mathematical complexity during the inference phase is reduced. This process is called permanent pruning.

2.4 Automatic, On-The-Fly Deactivation of Kernels During Inference Phase

In one embodiment, the elements of the vector sw are used as a set of switches that control the corresponding kernels in the (i+1)-th convolutional layer (54 in FIG. 5), depending on the input from the i-th layer (51 in FIG. 5). Since the value of each $sw_i$ can be any real number between 0 and 1, a simple thresholding is used as the activation criterion, where the elements of the vector sw are binarized (53 in FIG. 5) (i.e. forced to take values 1 or 0) using a threshold value thres as follows:

$$sw_{ti} = \begin{cases} 0, sw_i < thres \\ 1, sw_i \geq thres \end{cases} \qquad (4)$$

The resulting binary activation vector $sw_t$ is the indicator of whether to apply the corresponding filtering kernels on the input data or skip the particular computations (54 in FIG. 5). Note that during inference, switches S2 (346 in FIG. 3) and S3 (448 in FIG. 4) are activated, while switches S1 (345 in FIG. 3) and S4 in (449 in FIG. 4) are deactivated By controlling the threshold parameter thres, one can also control the amount of computing elements to be used, so to better adapt the CNN to the available computational resources of a system. This can be done without loss of the inference accuracy, or by trading-off some of the inference accuracy, when the system resources are small.

2.3 Controlled Automatic, On-The-Fly Deactivation of Kernels During Inference Phase In one embodiment, and by means of a special devised training strategy, the elements of the vector sw during inference could reflect the significance of the corresponding convolutional kernel: A higher value for the element $sw_i$ signifies that the specific kernel corresponding to this element has an increased influence on the overall inference computation process.

In this embodiment, a pre-specified number k of the most influential kernels, corresponding, for example, to the k larger elements of the vector sw are activated during inference. The number k is dictated externally through a special mechanism reflecting some constraint such as the available computational time, or available resources, battery power etc., and at a specific time instance of the inference session.

2.5 Application on Networks Organized in Modules.

In the event that a convolutional neural network is organized to use network modules, the idea of parsimonious inference can also be used. In such an embodiment, LKAMs target to control the activity of the larger convolutional kernel sub-modules inside these modules (1414 and 1416 in FIG. 6). The LKAMs (1417 and 1418 in FIG. 6) share the same input with the corresponding modules they control, according to an exemplary configuration shown in FIG. 6.

This configuration ensures the maximum possible gain from a potential deactivation of kernels, since a much more significant load corresponds to the larger kernels ($N_e$ is usually equal or larger than 3) than the 1×1 kernels also present within the module.

2.6 Application of the Technique in Fully-Connected Layers

The fully connected layers in a convolutional network are feed-forward artificial neural networks and they consist of multiple layers, which are fully connected to each other. In other words, every single neuron (e.g. a computing element usually corresponding to a linear function performed on its inputs), in a fully connected layer is linked to a number of neurons in the next layer.

Fully-connected layers (such as these of 42 in FIG. 1) can also be addressed as shown in FIG. 6A.

In one embodiment, the processing elements of any layer (called neurons), are grouped into an arbitrary number of neurons (103 in FIG. 6A). The LKAM (102 in FIG. 6A) is connected between the inputs of those neurons and their outputs (104 in FIG. 6A). In this way, the LKAM is able to control the information flow through those neurons and through training is able to diminish their influence. As a result, calculations associated with those neurons will be omitted in the inference phase, saving computations and memory.

2.7 Permanent Pruning—Deactivating of Whole Convolutional Layers or Modules

The computational gain achieved by kernels being deactivated can be extended to the layer-level, in the event that a residual CNN architecture is employed. In residual CNNs [He], each convolutional layer is only responsible for, in effect, fine-tuning the output from a previous layer by just adding a learned "residual" to the input.

An exemplary embodiment incorporating this idea is depicted in FIG. 7. Residual CNN architectures utilize layer bypass connections (68, 69 in FIG. 7), which offer an alternative path for information flow between consecutive convolutional layers. Such connections enable a complete deactivation of a convolutional layer without interfering with the subsequent processing stages.

In this case, when the LKAM is connected between two subsequent convolution layers (66 in FIG. 7), it is able to disable a complete network without interfering with the information flow between subsequent convolutional layers.

2.8 VLSI Hardware Implementation

In one embodiment, the deep learning network could be implemented as a VLSI hardware implementation, where all the filter kernels are to be implemented as separated hardware blocks in a parallel architecture where all the filter kernels are operating on the same feature map.

In that event, the LKAM can be implemented as an array of switches by virtue of a set of voltage controllable switches (i.e. CMOS transistors) as shown in FIG. 8. In this case, the circuitry implementing the convolutional kernels (82 in FIG. 8) can be switched-off, by cutting feed in both power and clock inputs through some digitally-controlled switching device (such is a CMOS transistor, 83 in FIG. 8), saving this way the energy corresponding to both its dynamic and static bias consumption.

The exemplary systems and methods of this disclosure have been described in relation to image analysis. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, options, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. Similarly, one or more functional portions of the system could be distributed between a camera device(s) and an associated computing device(s).

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and/or fiber optics, and may take the form of acoustic or light waves, such as those generated during radio-wave and infra-red data communications.

Also, while the flowcharts and methodology have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide and/or claim some features of the disclosure without providing others.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel®

Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, sub combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

REFERENCES (ALL OF WHICH ARE INCORPORATED HEREIN BY REFERENCE IN THEIR ENTIRETY)

[BLH] Yann LeCun, Yoshua Bengio, Geoffrey Hinton, "Deep Learning", Nature 521, 436-444 (28 May 2015)

[Ba] Jimmy Ba and Rich Caruana. Do deep nets need to be deep? In NIPS, pages 2654-2662, 2014

[Cheng] Yu Cheng*, Felix X. Yu*, Rogerio Feris, Sanjiv Kumar, Alok Choudhary, Shih-Fu Chang (*equal contribution), An exploration of parameter redundancy in deep networks with circulant projections, in ICCV 2015

[Feng15] Jiashi Feng, Trevor Darrell; Learning The Structure of Deep Convolutional Networks, The IEEE International Conference on Computer Vision (ICCV), 2015, pp. 2749-2757

[Flickr] M. J. Huiskes, M. S. Lew (2008). The MIR Flickr Retrieval Evaluation. ACM International Conference on Multimedia Information Retrieval (MIR'08), Vancouver, Canada

[Food-101] L Bossard, M Guillaumin, L Van Gool, Food-101—Mining Discriminative Components with Random Forests European Conference on Computer Vision (ECCV)

[Graves] Alex Graves and Jurgen Schmidhuber. Framewise phoneme classification with bidirectional lstm and other neural network architectures. Neural Networks, 18(5): 602-610, 2005.

[Han2015] S. Han, J. Pool, J. Tran, and W. J. Dally, "Learning both Weights and Connections for Efficient Neural Networks," in Proceedings of Advances in Neural Information Processing Systems (NIPS), 2015.

[He] Kaiming He, Xiangyu Zhang, Shaoqing Ren, Jian Sun, Deep Residual Learning for Image Recognition

[Hu16] H. Hu, R. Peng, Y.-W. Tai, and C.-K. Tang, "Network Trimming: A Data-Driven Neuron Pruning Approach towards Efficient Deep Architectures", arXiv preprint arXiv:1607.03250, 2016]

[ILSVRC] Olga Russakovsky*, Jia Deng*, Hao Su, Jonathan Krause, Sanjeev Satheesh, Sean Ma, Zhiheng Huang, Andrej Karpathy, Aditya Khosla, Michael Bernstein, Alexander C. Berg and Li Fei-Fei. (*=equal contribution) ImageNet Large Scale Visual Recognition Challenge. IJCV, 2015

[Krizhevsky] Alex Krizhevsky, Ilya Sutskever, and Geoffrey E Hinton. Imagenet classification with deep convolutional neural networks. In Advances in neural information processing systems, pages 1097-1105, 2012. 8

[PeforatedCNNs] Michael Figurnov, Dmitry Vetrov, and Pushmeet Kohl, PerforatedCNNs: Acceleration through Elimination of Redundant Convolutions, arXiv, 2015, website: arxiv.org/pdf/1504.08362.pdf

[Squeeze] Iandola, Forrest N., et al. "SqueezeNet: AlexNet-level accuracy with 50× fewer parameters and <1 MB model size." arXiv preprint arXiv:1602.07360 (2016

[Yang] Tien-Ju Yang, Yu-Hsin Chen, Vivienne Sze: Designing Energy-Efficient Convolutional Neural Networks using Energy-Aware Pruning. CoRR abs/1611.05128 (2016)

[Wen16] Wen, Wei, Wu Chunpeng, Wang Yandan, Chen Yiran, Li Hai, Learning structured sparsity in deep neural networks Advances In Neural Information Processing Systems, pp, 2074-2082, 2016

The invention claimed is:

1. A method, in a convolutional neural network (CNN), comprising:

expressing the CNN final structure by a number of total convolutional layers, and automatically determining a number of total kernels in each specific layer utilizing a regular back-propagation optimization procedure, wherein a Learning Kernel Activation Module (LKAM) generates, for each input datum during inference, a gating vector based on feature maps of a preceding convolutional layer, and the gating vector selectively activates or deactivates convolutional kernels of a subsequent convolutional layer for that input datum, and wherein the CNN is implemented in VLSI hardware, and each kernel is connected to a CMOS transistor switch such that kernels deactivated by the gating vector are electrically disconnected from one or more of power supply and a clock signal.

2. The method of claim 1, wherein the gating vector is produced by operations comprising at least one 1×1 convolution, global average pooling, and a sigmoid activation function, followed by a thresholding operation that yields a binary activation signal for each kernel.

3. The method of claim 1, wherein kernels deactivated by the gating vector are not executed.

4. The method of claim 1, wherein the LKAM adapts kernel activation to satisfy one or more of latency, compute, or energy budgets of an edge device.

5. A method to use a Learning Kernel Activation Module (LKAM) comprising:

automatically defining an optimal number of layers and convolutional kernels for a given training task through a regular back-propagation optimization procedure, wherein the LKAM generates, for each input datum during inference, a gating vector based on feature maps of a preceding convolutional layer, and the gating vector selectively activates or deactivates convolutional kernels of a subsequent convolutional layer for that input datum, and wherein the LKAM is implemented in VLSI hardware, and each kernel is connected to a CMOS transistor switch such that kernels deactivated by the gating vector are electrically disconnected from one or more of power supply and a clock signal.

* * * * *